United States Patent [19]

Smyly, Sr.

[11] Patent Number: 4,911,459
[45] Date of Patent: Mar. 27, 1990

[54] LAUNCHER/RETRIEVER CRADLE FOR TRAILERED BOATS

[76] Inventor: George M. Smyly, Sr., 1903 Carlton St., Apt. B, North Charleston, S.C. 29405

[21] Appl. No.: 305,275

[22] Filed: Feb. 2, 1989

[51] Int. Cl.$^4$ ................................................ B60P 3/10
[52] U.S. Cl. ..................................... 280/414.1; 414/479
[58] Field of Search ...................... 280/414.1; 414/483, 414/482, 477, 478, 479, 486, 498, 532; 114/344

[56] References Cited

U.S. PATENT DOCUMENTS

| | | | |
|---|---|---|---|
| 4,395,185 | 7/1983 | Whaley | 280/414.1 |
| 4,626,162 | 12/1986 | Parisi | 280/414.1 |

*Primary Examiner*—Charles A. Marmor
*Assistant Examiner*—Donn McGiehan

[57] ABSTRACT

A cradle, having positive buoyancy, and wheels, at the stern, is launched and recovered by a push/pull rod assembly pivotally attached to the forward portion of the cradle platform. Cabling, looping a double pulley forward and a single roller assemble pulley aft, oppositely wound on a reversible drum winch, moves the push/pull rod. A folding stabilizer assembly, doubling as a walk-way between the trailer bed and cradle, is attached at the wing ends of a raised cross tee by pivotally conecting near the tops of two vertical members of the cross tee. Upon the trailer bed, two grooved, parallel rails maintain a close tolerance hold upon a sliding platform assembly. The folding stabilizer is also pivotally attached to this sliding platform.

7 Claims, 5 Drawing Sheets

LAUNCHER/RETRIEVER CRADLE FOR TRAILERED BOATS

CROSS-REFERENCES TO RELATED APPLICATIONS

BACKGROUND OF THE INVENTION

This invention relates to the launching and recovery of trailered boats. Primary methods of launching and recovering boats are drive-on trailers, and trailers having numerous roller configurations. Among other methods in use are trailers with elongated tongues, retractable extension tongues, floating trailers, self leveling trailers and extendable trailers.

All above methods require that the trailer be partially, or completely submerged during launching and recovery of boats. Boaters have numerous problems at the boat ramp, especially in cool and cold weather, because of wetness, hull friction, injuries from manual winch handles, currents, winds and waves, climbing to and from the boat, missing the trailer, recovering a boat loaded with crabs, clams, oysters, lobsters, fish, passengers, and boarding passengers, to name several.

There exist a need for a launching and recovery method wherein a trailered cradle, containing and protecting a boat, is shifted from the trailer bed to the water and then back to the trailer bed.

A need exist such that the above mentioned cradle has positive buoyancy and wheels at the open, or aft, end and that a reversible drum winch and cabling system operates a push/pull rod such that the rod controls the movement of the cradle.

An exacting need exist for a stabilizing system which secures the alignment of the launched cradle with relation to the trailer bed. This stabilizer assembly must provide a dry walk-way from the trailer bed to the bow of a cradled boat.

SUMMARY OF INVENTION

Objective reasons for this present invention are to provide safe and convenient launching and recovery of trailered boats by using a cradle which contains and protects the craft while transporting, launching, and recovering the same.

Another object is to provide a stabilizer assembly that will prevent negative effects of currents, winds, and waves upon the alignment of the launched cradle, and will double as a dry walk-way between the trailer bed and the bow area of the cradled boat.

Another object is to provide a method whereby a boat, self aligned, lightly buoyed by the positive buoyancy of the cradle, and yet floating in the cradle, is easily, experiencing little friction, piloted from or onto the cradle platform.

Another objective is to provide a method of launching and recovering a boat such that the transporting trailer bearing housings, springs, pulleys, rollers, cabling, electrical equipment, especially lights, or any auxiliries, are never submerged, especially in salt water.

Another objective is to promote general boating, and this especially in colder climates, or during cool seasons, and aiding persons required upon the waters, by providing wet free launching and recovery of trailered boats.

Another objective is to provide a means whereby direct winching, tossing ropes to shore, bottoming out, missing the trailer during recovery, and hull damage in general, are eliminated by waterborne docking and securing the craft within the cradle.

Another objective is to diversify the material composition of trailer rollers by eliminating the need for hull protecting roller materials.

Another objective is providing a solution to the problem of low tide launching, and especially recovery, of boats, usually hampered by the washout at the edge of most ramps. This, sometimes serious, problem is solved, because, using this launching and recovery method, the trailer wheels do not need to drop into the wash-out.

Another object is to provide a method of pulling the trailer and cradled boat from the ramp, in a straight line only, while the cradle is partially retracted aboard the trailer bed.

Another object is to provide a method of shifting the center of gravity of the loaded trailer by push-button movement of the cradle, stabilizer, push/pull rod, and boating equipment. A reversible winch and particular cabling system makes this possible. Hitching, and unhitching, of the trailer tongue is simplified when the tongue weight is easily controlled.

BRIEF DESCRIPTION OF THE DRAWINGS

With the stated objectives in view, and additional objects and advantages, as will hereinafter appear, this invention consist of the shapes, combinations and arrangements of materials described by examples and illustrated in the following drawings.

DETAILED DESCRIPTION

Figure 1:
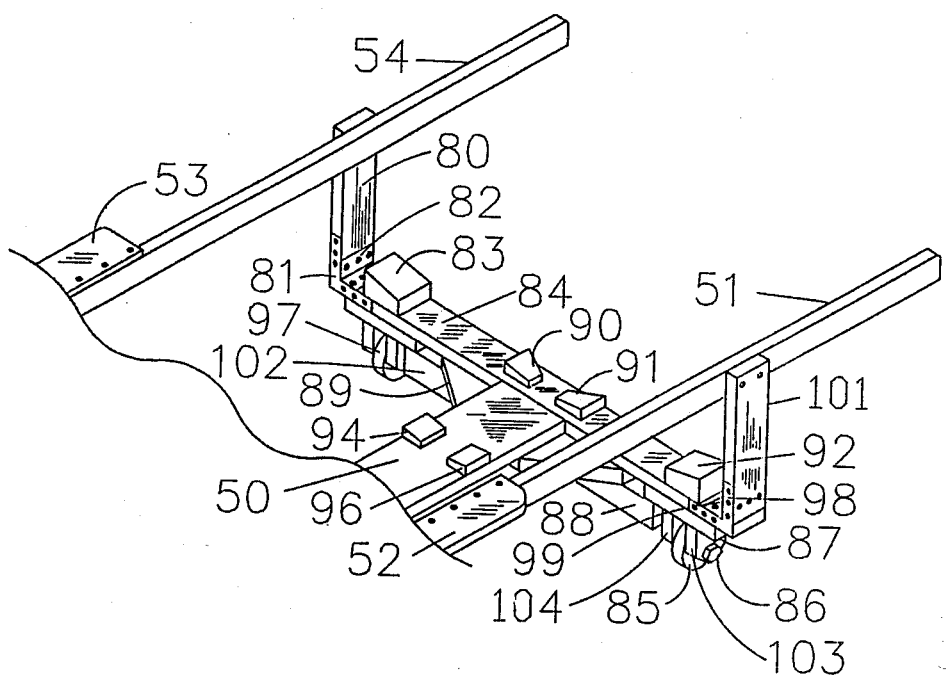
FIG.1 is a partial perspective view of the open, positively buoyed, wheeled, aft end of the cradle. Boat guide rails, keel guides, transom area support blocks, the cross tee, boat rail guide supports, and related hardware, are shown.

Referring to the drawings, this invention contemplates simultaneously launching and recovering a trailered cradle and cradled boat. FIG.1 shows the boat entrance/exit cradle area. Boat guide rails 51, 54 and keel guides 90, 91 align the boat as it enters the cradle. Keel guides 90, 91, 94, 96 assist the cradle platform 50 in supporting the weight of the boat. Keel guides 90, 91, 94, 96, transom support blocks 83, 92, and guide rails 51, 54 maintain vertical alignment of the craft. Transom support blocks 83, 92 transfer the aft weight of the boat thru the sandwiched cross tee 84 to the wheels 85, 97 when the wheels 85, 97 are on the landing. Warping and bending of the cross tee 84 is thereby checked. Cross tee 84 is secured to the cradle platform 50 by gusset 89. Boat guide rail stiffeners 52, 53 maintain sufficient rigidity of guide rails 54, 51. Flat corner plates 81, 98 and flat inside corner braces 82, 99 secure vertical boat guide rail supports 80, 101 at their respective locations on the cross tee 84. Plastic flotation material 88, 102 provides proper positive buoyancy when the cradle is in the launched position. The axle bolt 86 is secured by supports 87, 103, 104. A simular axle bolt and supporting members exist at the starboard under area of the cross tee 84.

Figure 2:
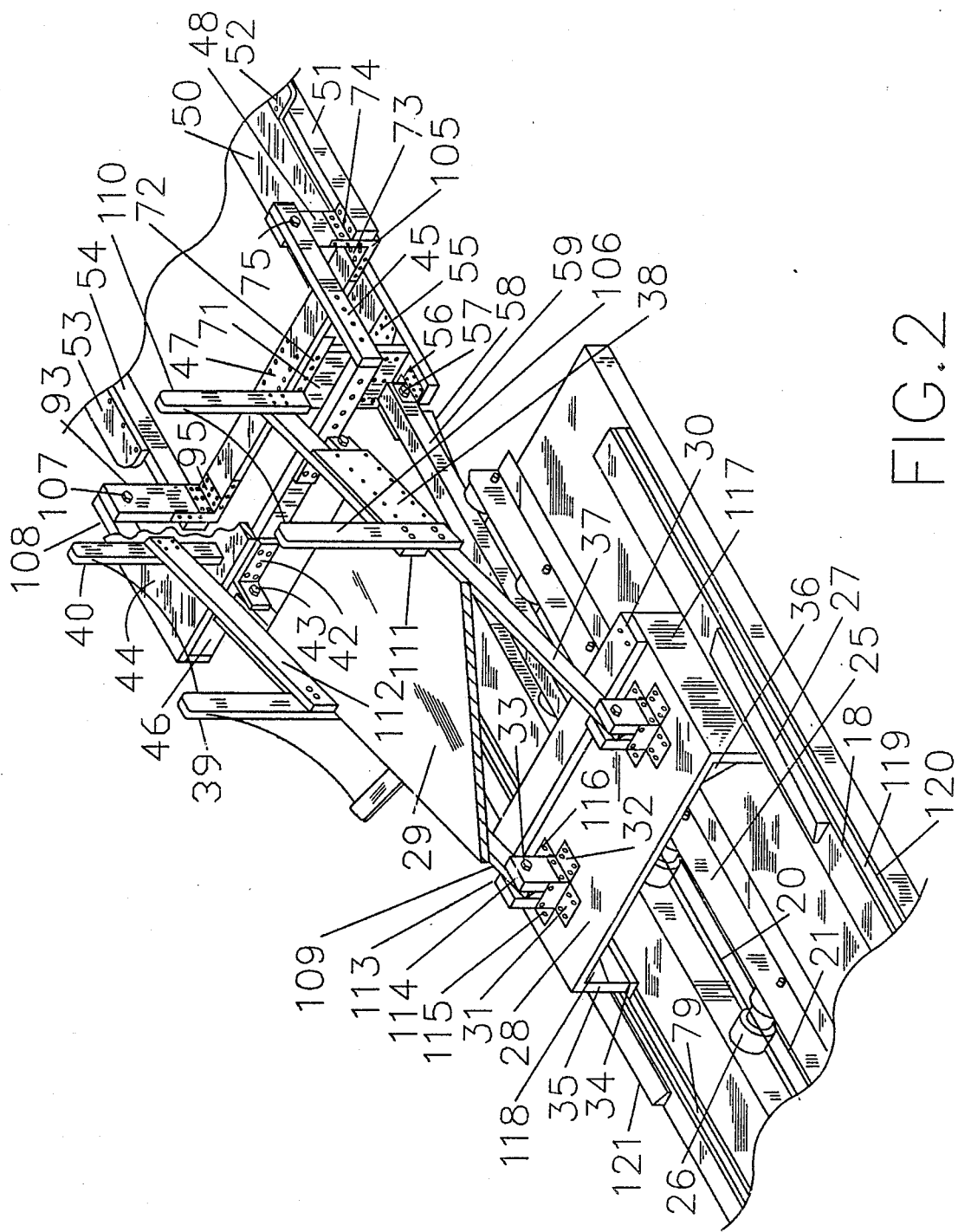
FIG.2 is a partial perspective view of the forward portions of the cradle, to include the cradle platform and its pivoted connection to the push/pull rod, general hardware locations, stabilizer pivot connections, and boat guide rail stiffeners. The view further shows the stabilizer assembly, the push/pull rod, several rollers, to include the pulley roller assembly, the boat hull supports, and the parallel, grooved stabilizer platform rails.

FIG.2 shows the stabilizer assembly, and partial views of the forward area of the cradle and the essential components at the aft end of this trailer bed. Cross tee vertical support 71 is secured to the cradle platform 50 by means of a heavy duty inside corner brace 55. Cross tee 47 is secured to vertical support 71 by means of an elongated, underneath mounted inside corner brace 72. A twin to corner brace 72 sandwiches vertical cross tee support 71 and is also secured to the cross tee 47. Vertical supports 48, 93 are secured to cross tee 47 by means of inside corner braces 73, 95 and flat corner plates 105, 106. Corner brace 74 secures boat guide rail 51 to the vertical support 48. A twin corner brace secures rail 54 to vertical support 93. Stiffeners 52, 53 maintain sufficient rigidity of boat guide rails 51, 54. Close tolerance shoulder bolts 75, 107 pivotally secure members 45, 108 to vertical supports 48, 93. Inside corner braces and platform 44 rigidly secure members 45, 108 to member 46. Angle piece 42 pivotally secures member 109 to member 46 via close tolerance shoulder bolt 43. A like kind pivitol point secures member 37 to member 46.

Hand rail supports 40, 110 double as stops as they contact the platform 44 portion of the stabilizer assembly. The hand rail stop support member 111 is secured to the member 37 by piece 38. Hand rail stop support member 112 is secured to member 109 by a piece similar to piece 38. Hand rail member 106 is secured to member 111 and member 37. Hand rail member 39 is secured to member 112 and member 109. Platform 44 is securely mounted on members 42, 45, 108, and platform 29 is securely mounted on members 37, 109.

The piece 113 is secured to the platform by the forward corner brace 31, aft corner brace 116, and corner brace 115. The piece 114 is secured to the platform by the forward corner brace 31, aft corner brace 116, and corner brace 32. The member 109 is pivotally secured and sandwiched between the piece 113 and the piece 114 by a close tolerance shoulder bolt 33. A like kind arrangement secures the member 37 to the platform 28.

The reinforcing member 30 is secured to the platform 28 and will sustain upward forces exerted by the forward end of the push/pull rod 59 when the cradle is in the launched mode.

The platform 28 is rigidly secured to the side support members 35, 117, this rigidity being accomplished by the triangular blocks 36, 118. Groove 79 entrapped member 34, and this is a close tolerance, slippery entrapment, is secured to member 35. A like kind groove entrapment exist securing member 117. A groove such as shown at the groove 79 is accomplished by sandwiching the member 119 between the member 18, and the member 120.

The boat hull support components 27, 121 are designed to assist boat guide rails 51, 54, and as before mentioned in FIG.1, keel guides 90, 91, 94, 96, and transom support blocks 83, 92, at maintaining vertical stability of a cradled boat as the boat is transported. Let it be understood that these components 27, 121 have no simultaneous lifting effect upon the under hull of a cradled boat, however, only as a safety factor, maintain vertical stability of the craft when the craft is in the loaded position. The components 25, 18, 119, 120 are secured to the trailer bed 26.

Three roller types are necessary for this invention and the roller 26 is typical of five of seven rollers. The two aft roller assemblies, and the typical rollers will be described in FIG.4. Cables 20, 21 will be described in FIG.3 and FIG.4.

Figure 3:
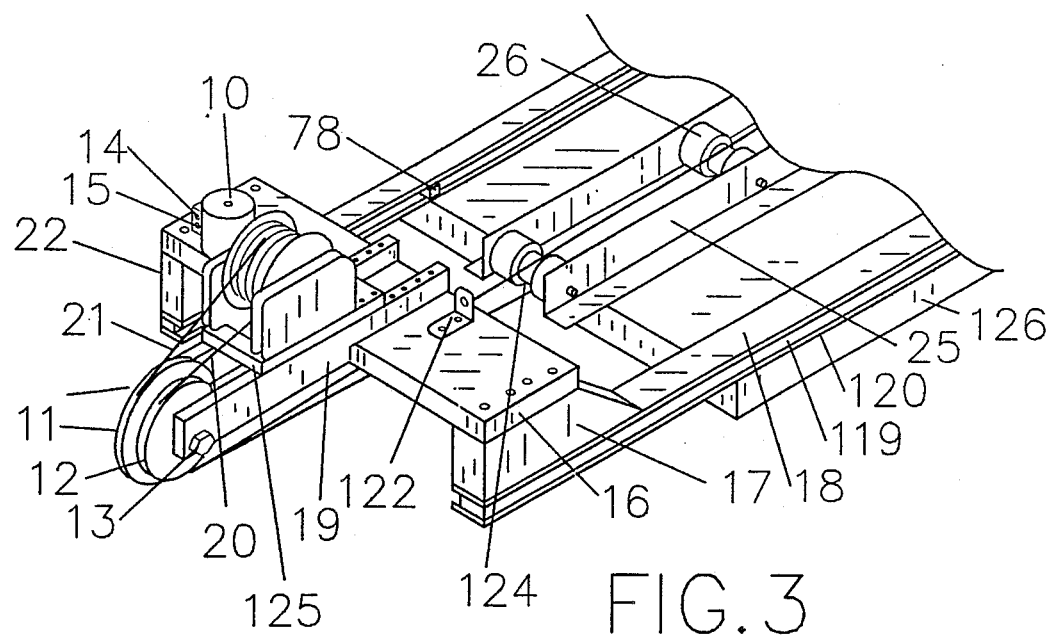
FIG.3 is a partial perspective view of the forward end of the trailer area showing the reversible drum winch, the launch/recover cables, and their corresponding pulleys, and stops for the stabilizer platform.
Figure 4:
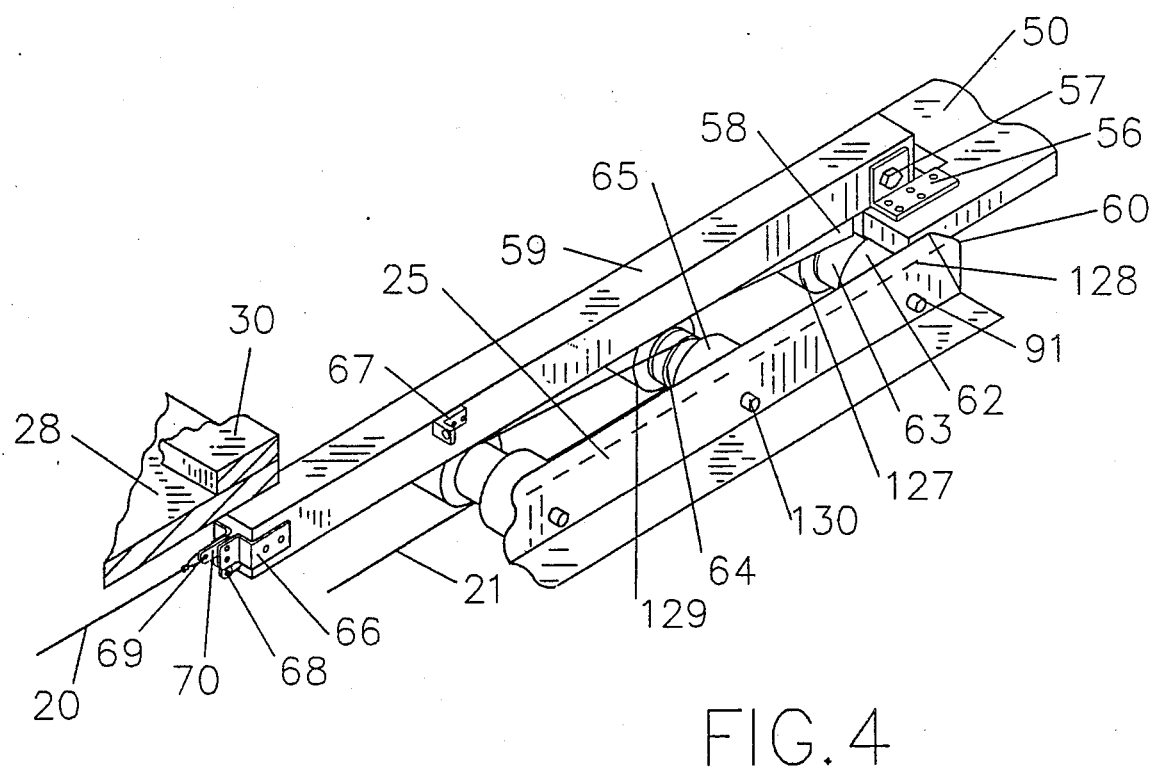
FIG.4 is a partial perspective view of the push/pull rod, pivotally connected to the cradle platform, the cradle platform guide rail, the push/pull rod angle attachment, and the pulley roller assembly for the launching cable. Also shown is the entrapment of the push/pull rod under the stabilizer platform.
Figure 5:
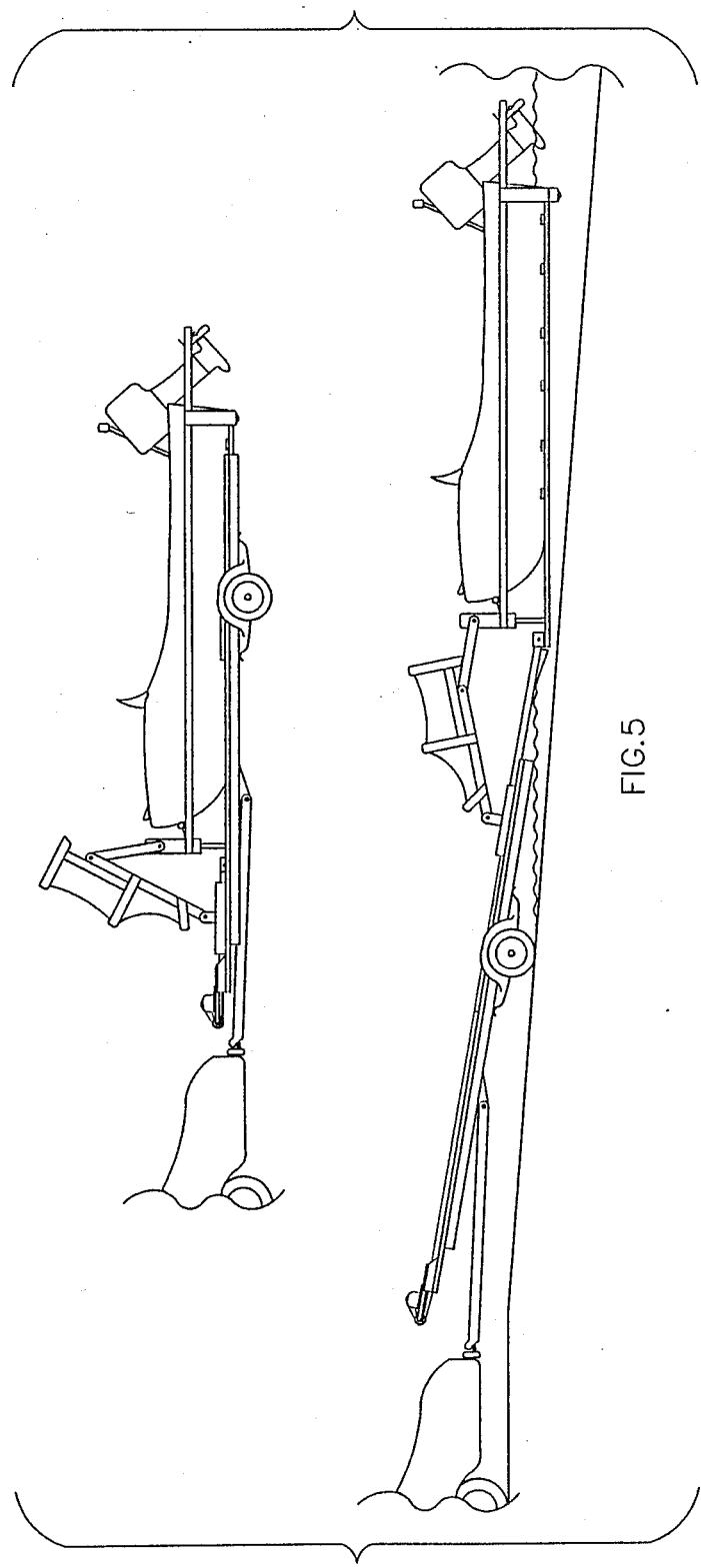
FIG.5 is a plain, unreferenced, view, of the cradle, as it would appear trailered, in both the launched and retrieved positions.

FIG.3 is a partial perspective view showing the forward components of the invention. The reversible drum winch 10, with launch pushbutton 14, and retriever pushbutton 15, has retriever cable 29, and launching cable 21 counter wound such that as cable 20 is wound, cable 21 is fed out proportionately. As cable 21 is wound, cable 20 is likewise fed out proportionately. Constant tension is maintained on the cables 20, 21. Retriever cable pulley 12 has a diameter such that retriever cable 20 clears the underside of support member 16. Launching cable pulley 21 has a larger diameter such that launcher cable 21 also clears the underside of support member 16 sufficiently allowing space for the forward end of before mentioned push/pull rod 59, FIG.1, to come to rest near the pulleys 11, 12. Launcher cable 21 will make a slight downward angle and rest of the underside of the roller groove 124. All extended cabling may rest in roller grooves. FIG.4 will hereinafter describe launcher cable 20 and retriever cable 21.

The drum winch 10 is secured to piece 125, which is in turn secured to members 19, 24. Members 19, 24 are rabbet secured to the support member 16. Spacers 17, 22 provide the proper elevation for the launcher cable 20 and the retriever cable 21. The spacer 17 is sandwiched between the support member 16 and members 18, 119, 120. A like kind securing exist at spacer 22. The launcher pulley 12, and retriever pulley 11 have a shift space such that cables 20, 21 are maintained single layer upon the drum winch 10. Item 122 is a safety securing device for a chain which may be fastened to the push-/pull rod 59, FIG.4. The piece 78 is a stop for the sliding member 34 shown in FIG.2. The piece 78 has a like kind stop member in the groove opposite. The components 25, 18, 119, 120 are secured to the the trailer bed 126.

FIG.4 is a partial perspective view of the push/pull rod 59, and components at the rear of the trailer bed 126. The push/pull rod 59 is pivotally connected to the cradle platform 50 via shoulder bolt 57 and angle piece 56. The forward portion of the push/pull rod 59 is shown in relation to the platform 28 and platform stiffener 30 when at the extreme position. There is space for the end of the push/pull rod 59 to flip-flop vertically, yet remaining trapped under the platform 28.

The rollers 62, 63, 127 are free to rotate independently at their own speed upon the pin 91. As the cradle platform 50 is leaving rollers 62, 127 the push/pull rod angle piece 58 comes into contact with the top of roller 63. As the cradle platform 50 continues to move from rollers 62, 127 push/pull rod angle piece 58 gradually lowers the push/pull rod 59 upon roller 63. At this time, the push/pull rod is secured in a center position by the inner edges of rollers 62, 127. At this time the end of the push/pull rod 59 may harmlessly flop up, yet remain trapped under platform 28. The area 60 is curved such that the cradle platform 50 will not snag a corner during retraction. The roller support angle member 25 has a top edge 128 which extends above the top portion of all rollers. Cradle platform 50 is held aligned on the rollers by this extended edge.

The rollers 64, 65, 129 independent rotate on pin 130. Grooved roller 64 serves as a pulley for launching cable 21. The end of launching cable 21 is attached to the bottom aperture 68 of piece 70. From the piece 70 the launching cable runs under the push/pull rod 59 and loops over the top of grooved pulley 64 and from under all other rollers, returns to the drum winch 10, FIG.3. via launcher pulley 11, FIG.3. Retriever cable 20 is attached to the upper aperture 69 of piece 70, and runs to the drum winch 10, FIG.3, via retriever pulley 12, FIG.3. Piece 70 is secured sandwiched by the flanking bracket 66. Bracket 66 is secured to the end of the push/pull rod 59. Item 67 is a safety tie point for a cable or chain when the trailer is being transported.

Disclosed are the necessary embodiments of the invention as it functionally exist in prototype, or is presently contemplated. It is to be understood that various changes and modifications may be made thereto without departing from the concepts of the invention.

What is claimed is:

1. A launcher/retriever boat cradle comprising:
  a. a boat keel support platform including keel guide/support blocks;
  b. a buoyant wheeled cross tee member including boat transom support blocks and boat keel guide/support blocks, said buoyant wheeled cross tee member secured to the aft end of said boat keel support platform;
  c. angle members including rollers, said angle members including edges extending above rollers such that said boat keel support platform upon said rollers is aligned within said extending edges;
  d. a folding stabilizer pivotally secured to two vertical members of a second cross tee, said second cross tee secured to a forward vertically secured member of said boat keel support platform, said folding stabilizer also pivotally secured to a stabilizer platform, said stabilizer platform including side support members, said side support members having a slippery entrapment upon two rails;
  e. a push/pull rod pivotally connected to forward end of said boat keel support platform;
  f. launcher and retriever cables counter wound on a reversible drum winch, said retriever cable via a forward pulley is attached to the free end of said push/pull rod and the said launcher cable via a forward pulley and aft pulley is also attached at the said free end of said push/pull rod;
  g. whereby movements of said push/pull rod, keel support platform, stabilizer and stabilizer platform are accomplished.

2. The launcher/retriever boat cradle of claim 1 including a folding stabilizer, said folding stabilizer including platforms to walk upon, and said folding stabilizer including hand rails.

3. The launcher/retriever boat cradle of claim 1 wherein said boat keel support platform and said two cross tees include extended railings for guiding the hull of a boat, said railings also surroundingly engaging the hull of a boat.

4. The launcher/retriever boat cradle of claim 1 wherein said launcher/retriever boat cradle can be combined with a trailer.

5. A launcher/retriever boat cradle comprising:
  a. a boat keel support platform;
  b. angle members including rollers, said angle members including edges extending above rollers such that said boat keel support platform upon said rollers is aligned within said extending edges;
  c. a folding stabilizer pivotally secured to vertical members of a cross tee, said cross tee secured to a forward vertically secured member of said boat keel support platform, said folding stabilizer also pivotally secured to a stabilizer platform, said stabilizer platform including side support members, said side support members having a slippery entrapment upon two rails;
  d. a push/pull rod pivotally connected to forward end of said boat keel support platform;
  e. launcher and retriever cables counter wound on a reversible drum winch, said retriever cable via a forward pulley is attached to the free end of said push/pull rod and the said launcher cable via a forward pulley and aft pulley is also attached at the said free end of said push/pull rod;
  g. whereby movements of said push/pull rod, keel support platform, stabilizer and stabilizer platform are accomplished;

6. The launcher/retriever boat cradle of claim 5 including a folding stabilizer, said folding stabilizer including platforms to walk upon, and said folding stabilizer including hand rails.

7. The launcher/retriever boat cradle of claim 5 wherein said launcher/retriever boat cradle can be combined with a trailer.

* * * * *